United States Patent [19]

Bertolini et al.

[11] Patent Number: 4,986,030
[45] Date of Patent: Jan. 22, 1991

[54] DEVICE FOR A SLIDING COUPLING BETWEEN A WINDOW AND A WINDOW-RAISER MECHANISM IN A VEHICLE

[75] Inventors: Carlo Bertolini, Paris; Philippe Becerril, Darvoy, both of France

[73] Assignee: Rockwell-CIM, France

[21] Appl. No.: 411,754

[22] Filed: Sep. 25, 1989

[30] Foreign Application Priority Data

Sep. 29, 1988 [FR] France .................................. 88 12760

[51] Int. Cl.⁵ .............................................. E05F 11/44
[52] U.S. Cl. ......................................... 49/351; 49/375
[58] Field of Search .................. 49/351, 350, 374, 375, 49/376, 377, 502

[56] References Cited

U.S. PATENT DOCUMENTS 4,811,519 3/1989 Gold ................................ 49/351 X

FOREIGN PATENT DOCUMENTS 1410680 10/1975 United Kingdom .................. 49/351

Primary Examiner—Phillip C. Kannan

[57] ABSTRACT

A device which includes two matching sections (7, 8), with a first section (7) designed to be fastened to the bottom of a window (6) and the second section (8) arranged to be articulated on an arm (3) of a window raiser. The cross-sections of these sections are such that the first section (7) can be locked into the second section (8) by snapping and a result of a displacement lying substantially in the general plane of the window (6) and of the movement of the latter. The matching cross-sections of the two sections (7, 8) provide a degree of rotation and a degree of translational motion between the two sections. This device makes it possible to carry out the installation of windows on window raisers automatically by robot on motor-vehicle assembly lines because of the simplification of the necessary movements.

7 Claims, 4 Drawing Sheets

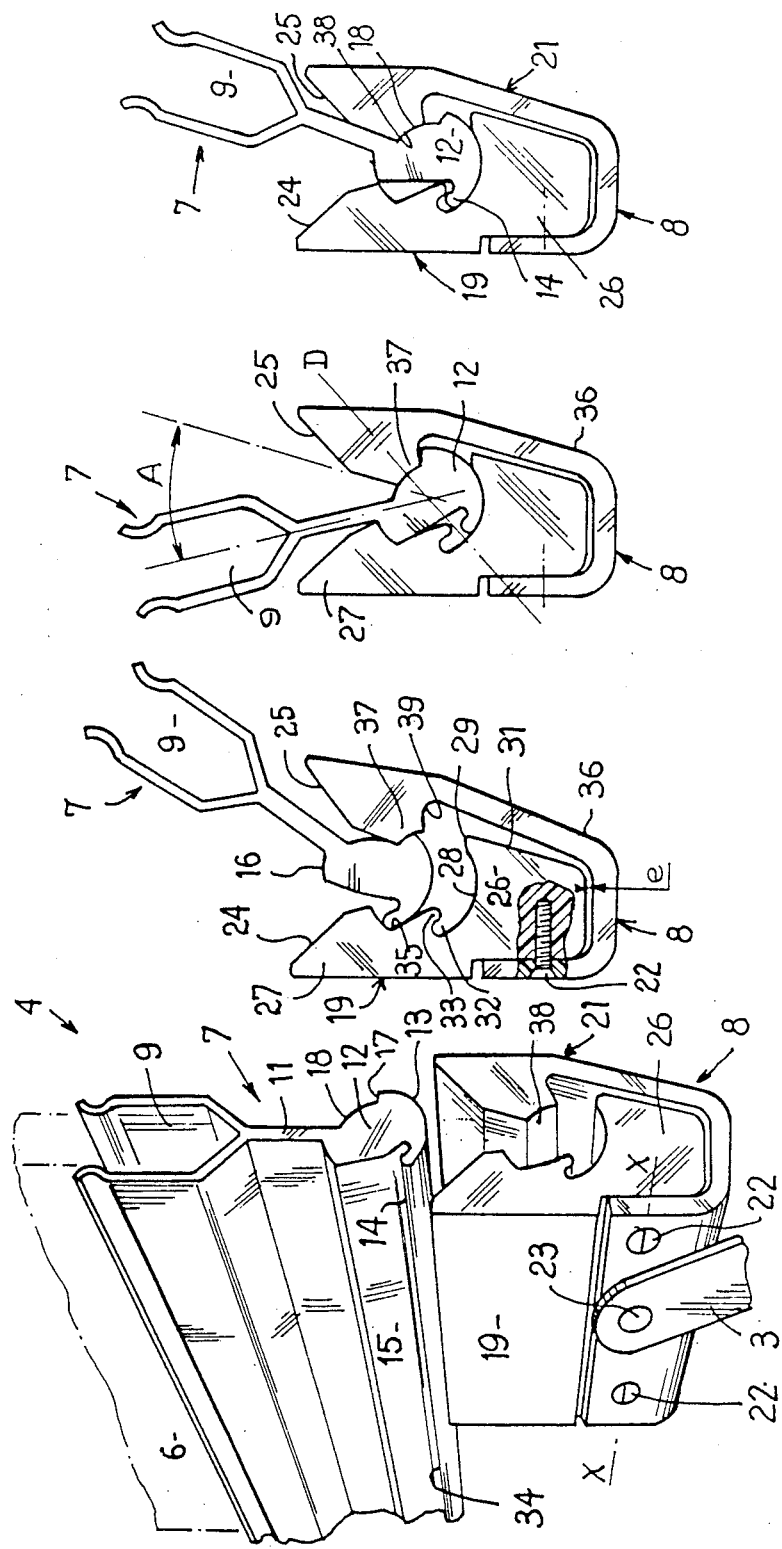

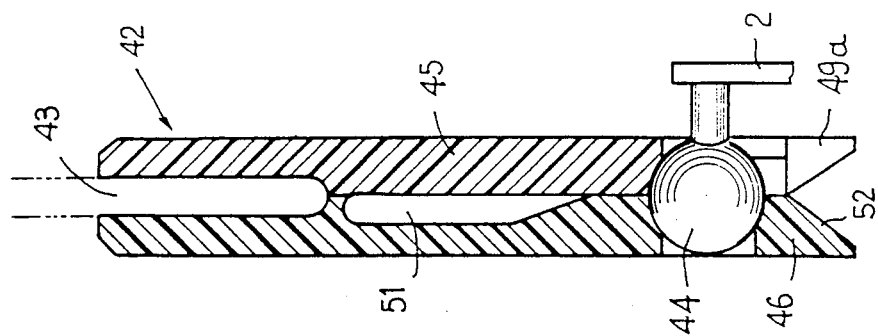
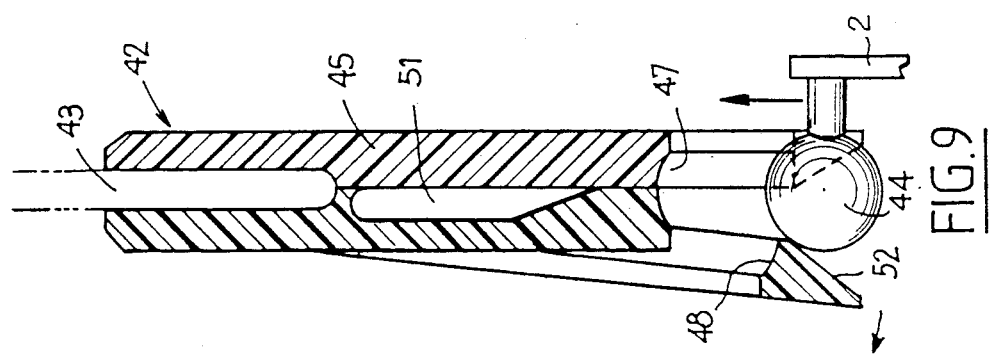
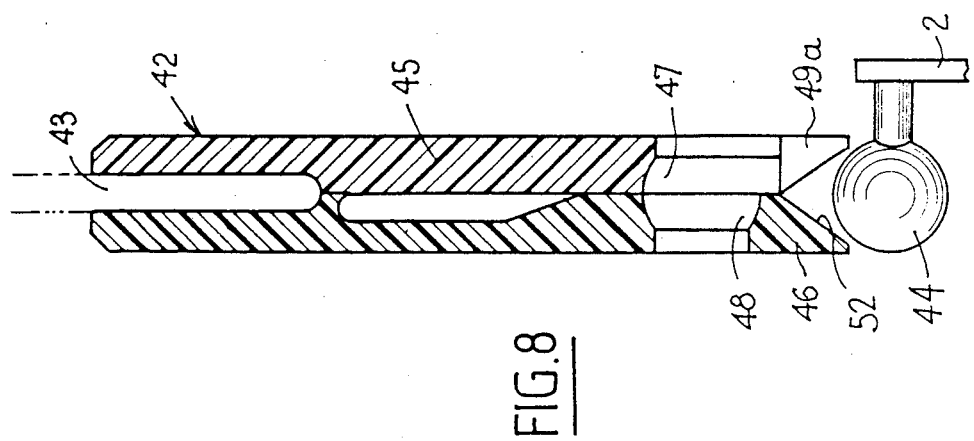

DEVICE FOR A SLIDING COUPLING BETWEEN A WINDOW AND A WINDOW-RAISER MECHANISM IN A VEHICLE

The subject of the present invention is a coupling device between a window and a window-raiser mechanism in a motor vehicle.

As is known, installation of windows on the corresponding window-raiser mechanisms in the doors of vehicles has to be carried out manually on the vehicle assembly lines. For this purpose, the operator brings the end runners or rollers of the arms of the window raiser into slideways fastened to the bottom of the window. These operations, which take place partially "blind", are too complex for it to be possible to carry them out by means of a robot, in view of the automation of motor-vehicle assembly lines.

The object of the invention is, therefore, to provide a coupling device of such a kind that the coupling can be carried out by a robot carrying the window, without any manual involvement.

According to the invention, the coupling device comprises, in combination, two matching sections, of which a first section is designed to be capable of being fastened to the bottom of the window and the second section is arranged to be articulated on an arm of the window raiser, and the cross-sections of these sections are such that the first section can be locked into the second by snapping and as a result of a displacement lying substantially in the general plane of the window and of the movement of the latter, the matching cross-sections of the two sections defining a degree of rotation and a degree of translational motion.

Since the movement of the window is substantially a vertical translational motion, the arrangement according to the invention makes it possible for a robot to carry out the interlocking of the two sections automatically by snapping.

According to one embodiment of the invention, the section carried by the arm of the window raiser is open in the form of a funnel and has a flexible lateral branch delimiting one edge of the funnel and capable of moving elastically apart from a rigid branch, and the lower surface of the section fastened to the window is rounded to make it easier to introduce the section into the funnel and then move apart the flexible branch and carry out the snapping.

According to a particular feature of the invention, the first section has a lip projecting laterally, as seen in cross-section, and extending longitudinally, limiting the rounded surface on this side, and formed in the rigid branch of the second section is a downwardly open longitudinal groove designed to receive the lip and keep the sections joined together after snapping, the lip being curved and directed upwards when the window is substantially vertical.

Further particular features and advantages of the invention will emerge from the following description made with reference to the accompanying drawings which illustrate one embodiment of it by way of non-limiting example.

FIG. 2 is a partial exploded perspective view of one of the two coupling devices according to the invention which can be seen diagrammatically in FIG. 1.

FIGS. 3, and 4 and 5 are cross-sectional views of the two sections of the device in FIG. 2, illustrating a coupling sequence.

Figure 1:
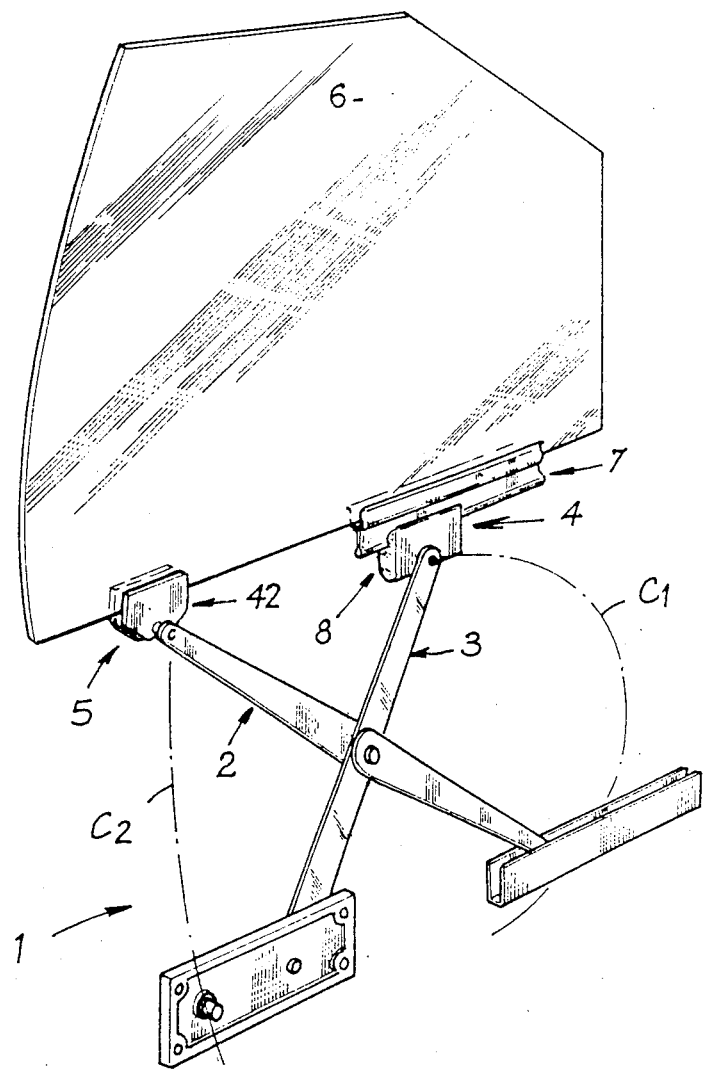
FIG. 1 is a simplified perspective view of a window-raiser mechanism and the corresponding window of a door (not shown) of a motor vehicle.
Figure 6:
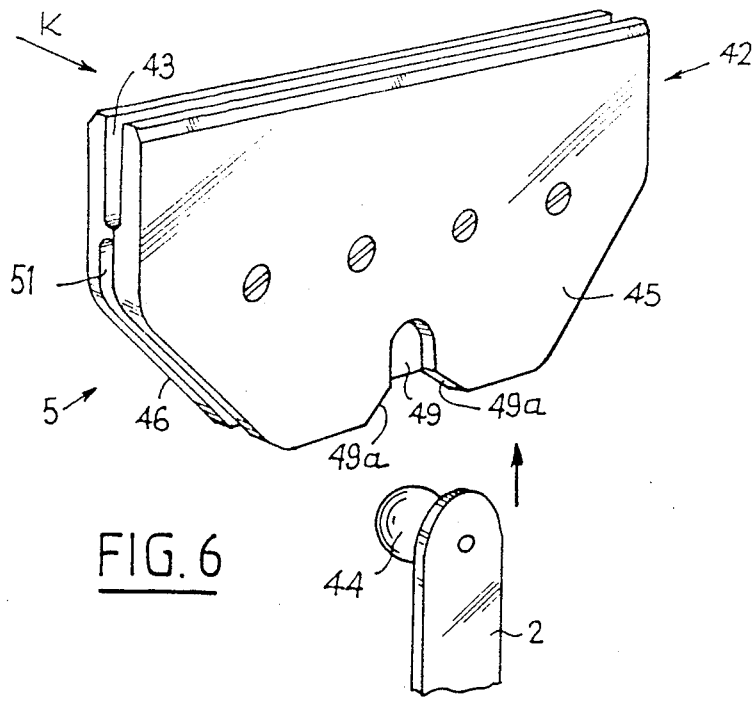

FIG. 6 is an exploded perspective view of a second embodiment of the coupling device according to the invention, equipping one of the arms of the window raiser which can be seen in FIG. 1.

Figure 7:
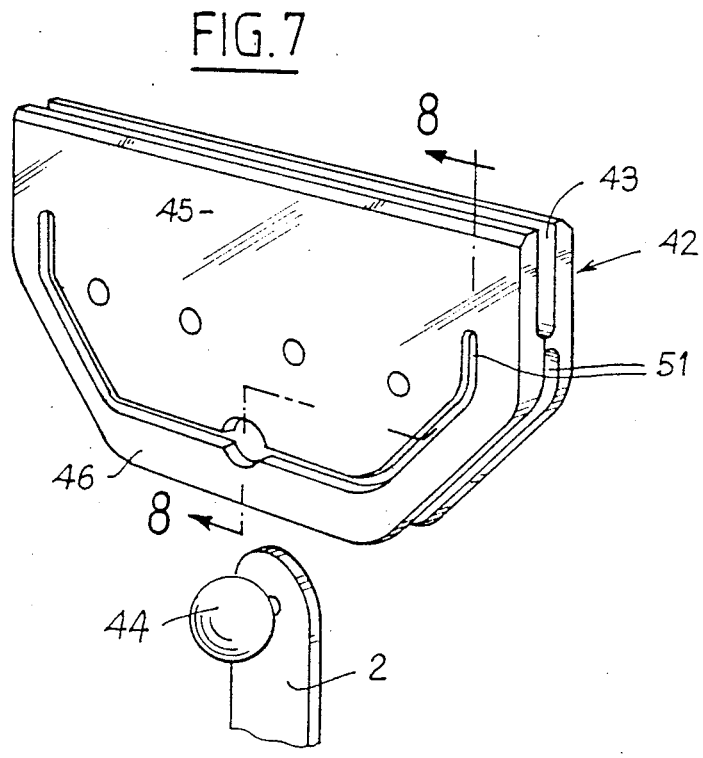

FIG. 7 is a perspective view of the device according to the arrow K of FIG. 6, that is to say towards the rear face of the section receiving the window.

FIGS. 8, 9 and 10 are cross-sectional views according to 8—8 of FIG. 7, illustrating a coupling sequence.

The device shown in FIG. 1 comprises a window-raiser mechanism 1 produced in a way known per se so as to be capable of being accommodated in a vehicle door (not shown). It comprises particularly two arms 2, 3 for supporting a window 6 by means of two respective coupling devices 5 and 4.

The joints of the arms 2 and 3 are designed in such a way that, during the raising and lowering of the window 4 (sic), the upper end of the arm 3 describes a semicircular curve C1, whilst the upper end of the arm 2 follows an almost straight path C2. In fact, the coupling device 4 is arranged to allow a sliding displacement of one of its component elements in relation to the window 6, this not being true of the coupling device 5.

The coupling device 4 comprises (FIGS. 2 to 5), in combination, two matching sections 7 and 8: the first section 7 is designed to be capable of being fastened to the bottom of the window 6 and for this purpose has a longitudinal groove 9 in the form of a U directed upwards, the second section 8 being arranged to be articulated on the arm 3.

The cross-sections of the sections 7 and 8 are such that the first section 7 can be locked by snapping and as a result of a displacement lying substantially in the general plane of the,.window 6 and of the movement of the latter, the complementary or matching cross-sections of the two sections 7, 8 defining a degree of rotation and a degree of translational motion of the section 8 in relation to the section 7.

The bottom of the groove 9 is extended by a central web 11 which is itself extended by a more solid end part 12. The lower surface 13 of this part 12 is rounded (convex) and limited along one side by a curved lip 14 projecting laterally, as seen in cross-section, and which extends longitudinally over the entire length of the section 7. Beyond the lip 14 extends a plane surface 15 adjoined to the base of the web 11 by means of an inclined step 16 and separated from the lip 14 by means of a longitudinal groove 34. On the opposite side to the projecting lip 14, the convex surface 13 is limited by a radial offset 17 extended by a convex surface 18.

The second section 8 is open in the form of a funnel and consists of two branches fastened to one another: a rigid inflexible branch 19, on which is articulated a flexible branch 21 fastened to the branch 19, for example by means of screws 22. The alignment of the screw heads 22 defines the longitudinal axis X—X of articulation of the branch 21 which surrounds the base of the branch 19 substantially beyond the fastening screws 22 and the axis of articulation 23 of the section 8 on the arms 3. The mutually confronting upper edges 24 and 25 of the branches 19 and 21 are inclined towards one another, so as to delimit between them an orifice in the form of a funnel (as seen in cross-section). This funnel makes it possible to introduce the end part 12 of the section 7 between the two branches 19 and 21 by snapping as a result of the moving apart of the branch 21.

The rigid branch 19 comprises a solid part 26 receiving the screws 22 and extending into the lower part of the branch 21, with a suitable gap e between them. This solid part 26 is extended by a thinner upper part 27 terminating in the inclined edge 24. The solid part 26 has an inner concave bearing surface 28 which is intended for the section 7, and for this purpose the radius of curvature of the concave surface 28 corresponds to that of the convex surface 13.

The surface 28 is limited, on one side, by a cant 29 which forms the intersection on the side 31 with the surface 28, whilst, on the opposite side, the surface 28 is joined to the bottom of a clearance 32 of a form complementary to that of the lip 14, so as to be capable of receiving the latter when the two sections 7, 8 are completely interlocked (FIG. 5). The clearance 32 is delimited, above the surface 28, by a projecting lip 33 of a size allowing it to be introduced into the corresponding groove 34. Finally, the lip 33 is joined to the inclined edge 24 by means of a recess 35.

The flexible branch 21 possesses, between its upper edge 25 and its part 36 surrounding the solid part 26, a shoulder 37, on the inner surface of which is formed a concave surface 38 matching the convex surface 18, the radii of curvature of these two surfaces therefore being virtually equal. The concave surface 38 is joined to the thinner part 36 by means of an offset 39, on which the radial offset 17 can come to bear when the section 7 and the window 6 have a suitable inclination (FIG. 4).

The concave surface 28 is positioned in such a way that a diametral straight line D passing through its centre (FIG. 4) also passes through a point adjacent to the axis of articulation X—X of the branch 19.

The coupling of the section 7 previously fastened to the window 6 and of the section 8 carried by the arm 3 is carried out as follows by a robot (not shown) carrying the window 6, for example by electropneumatic suction means.

The window 6 and the section 7 carry out a descending movement above the section 8 after suitable inclination to the vertical (FIG. 3). The section 7 is thus inclined towards the flexible branch 21, its solid part 12 penetrating between the edges 24, 25 of the funnel and moving the branch 21 apart. The lip 14 comes up against the lower part of the recess 35, whilst the offset 17 comes in to contact with the concave surface 38.

The robot controls the continued descent of the window 6 and the section 7 as far as the bottom of the section 8.

The branch 21 continues to move apart from the solid part 26, until the lip 14 slides onto the lip 33 and comes in to contact with the concave surface 28, on which the convex surface 13 consequently likewise bears (FIG. 4). At the same time, the offset 17 has crossed the separating cant between the concave surface 38 and the clearance 39, on which it comes to bear. At the end of this operation, the section 7 is snapped into the section 8, the branch 21 of which has turned down onto the solid part 12. The latter is thus retained between the branches 19 and 21 as a result of the elastic force exerted on the convex surface 18 by the matching concave surface 38 and as a result of the bearing of the convex surface 16 on the complementary upper part of the recess 35.

In this respect, it is important to note that the positioning of the straight line D in relation to the axis X—X, as explained above, opposes the unsnapping of the branch 21 and therefore guarantees the retention of the section 7 in the section 8. Of course, if a sufficiently strong pull is nevertheless exerted on the section 7 in order to unsnap it from the section 8, the branch 21 will move apart and release the section 7. In practice, as an indication, the cross-sections of the sections 7 and 8 can be determined in such a way that the section 7 can lock into the section 8 under a force of 5 kg, whereas a force of 30 kg is necessary to tear it out of it.

In their normal final position, the section 7 and the window 6 are in such a position that the lip 14 comes to rest in the recess 32 and the convex surface 18 comes to bear on the concave surface 38.

After snapping, there is a degree of freedom in terms of rotation through an angle A between the sections 7 and 8 and a degree of freedom in terms of translational motion of the section 8 in relation to the section 7. Angle A (FIG. 4) allows the sections 7 and 8 to pivot relative to one another during the operating travel of the window 6.

Section 7 is much longer than section 8, so the latter can slide on section 7 during the operations of the window raiser.

The second coupling device 5 will now be described by reference to FIGS. 6–10.

This device comprises a single section 42 having a groove 43 designed for receiving the bottom of the window 6, and means for ensuring, by the snapping of part of this section, a swivel joint on a knuckle-forming sphere 44 fastened to the end of the arm 2.

As the section 42 is fastened to the window 6, is coupled to the sphere 44 as a result of a displacement of the window 6 substantially in its plane and in that of its movement, thus giving the sphere 44 three degrees of freedom in terms of rotation relative to the section 42.

The latter comprises a rigid part 45 and a flexible part 46 articulated elastically on the rigid part 45 on which it is normally held to bear, thus forming with the latter a gripper capable of retaining the sphere 44 as a result of the snapping of the elastic part 46 onto the rigid part 45.

Receptacles 47 and 48 of complementary spherical form are arranged opposite one another in the mutually confronting faces of the two parts 45 and 46 and are designed for receiving the sphere 44. Into the receptacle 47 of the rigid part 45 opens a widened indentation 49 which is formed in the lower edge of the part 45 and the edges 49a of which are chamfered to make it easier to introduce the sphere 44 into the receptacle 47.

The articulated part 46 is a lateral strip extending along the bottom of the section 42 and over its sides, substantially as far as the base of the groove 43. This strip 46 is delimited by a recess 51 formed in the section 42 and opening into that face of the latter opposite its rigid part 45. The contour of the recess 51, which forms along this face a slot in approximately the shape of a C in the example illustrated, is such that the strip 46 has the form of a handle capable of moving apart elastically from the rigid part 45 in response to a push of the sphere 44.

The edge 52 of the elastic strip 46 is chamfered opposite the indentation 49, to make it easier for the strip 46 to be moved apart and for the sphere 44 to be introduced into its receptacle.

The coupling of the section 42 fastened to the window 6 and of the sphere 44 carried by the arm 2 is illustrated in FIGS. 8 to 10. In FIG. 8, the section 42 is shown with its indentation 49 above the sphere 44. The robot then lowers the window and the section 42, in such a way that the sphere 44 slides on the chamfered edges 49a and 52, at the same time moving the peripheral strip 46 elastically apart (FIG. 9).

The robot continues the descent of the section 42, until (FIG. 10) the sphere 44 locks completely into its receptacle 47, 48, after the snapping of the strip 46. (For the sake of convenience, FIGS. 8 to 10 show the section 42 stationary and the sphere 44 movable, whereas in actual fact the opposite is true).

This coupling operation is therefore especially simple, since it can be carried out solely as a result of a single vertical translational motion controlled by the robot. After snapping, the sphere 44 and the arm have three degrees of freedom in terms of rotation relative to the section 42.

The coupling between the window 6 and the window raiser 2 can be carried out either, as in the example illustrated in FIG. 1, by means of a device 5 equipped with a section 42 stationary relative to the window 6 and a device 4 equipped with a section 8 sliding relative to the window, or by means of a single device 5 making it possible to connect a window 6 to a window raiser of the "rail" type.

The possible alternative embodiments include reversing the concave and convex surfaces of the sections 7 and 8, and also the surfaces 13 and 28, 38 and 18 and the lip 14 and groove 32 could be reversed.

What is claimed:

1. A coupling device between a window (6) and a window-raiser mechanism (2) in a motor vehicle, comprising: in combination, first and second matching sections (7, 8), said first section (7) being capable of being fastened to the bottom of the window (6), said second section (8) being adapted to be articulated on an arm (3) of the window raiser, and the cross-sections of said first and second sections are such that the first section (7) is movable into locking relation internally of a groove in the second section (8) by displacement of said first section and said window substantially in the general plane of the window (6) and snapping the first section in a retained position internally of said groove, with the cross-sections of said first and second sections (7, 8) providing translational motion between said first and second sections along a longitudinal axis of one of said members and a degree of relative rotation between said members about an axis parallel to said longitudinal axis.

2. A coupling device for coupling a window and a window-raiser mechanism in a motor vehicle comprising: in combination, first and second sections having complimentary cross-sections, said first section being capable of being fastened to the window and having rounded end surface, said second section is adapted to be articulated on an arm of the window raiser and is open in the form of a funnel along an edge thereof, one side of said funnel being defined by a flexible member capable of moving elastically apart from a rigid member defining another side of said funnel, and the cross-sections of said first and second sections are such that the rounded end surface of said first section is movable into locking relation internally of said funnel by displacement of said first section and a window fastened thereto substantially in the plane of the window to move said flexible member away from said rigid member until said first section snaps into a retained position internally of said funnel, with the cross-sections of said first and second sections providing a degree of rotational motion and a degree of translational motion between said first and second sections.

3. A coupling device according to claim 2, wherein said first section (7) has a lip (14) projecting laterally and extending longitudinally of said first section and limiting one side of the rounded end surface and a downwardly open longitudinally extending groove is formed in said rigid branch to receive said lip and retain said first and second sections (7, 8) joined together after snapping, said lip being curved and directed upwards when the window is substantially vertical.

4. A coupling device according to claim 3, wherein a side of the rounded end surface opposite said lip is limited by a radial offset (17) extended by a convex surface (18) which, after snapping, bears on a matching concave surface (38) formed internally on said flexible member.

5. A coupling device according to claim 4, wherein the flexible member is articulated on the rigid member about a longitudinal axis (X—X), and the rigid member has an inner concave bearing surface for receiving the rounded end surface of the first section (7) and the radius of curvature of said inner concave bearing surface corresponds to that of the rounded end surface of the first section.

6. A coupling device according to claim 5, wherein the concave surface formed internally of said flexible member is positioned such that a diametral straight line (D) passing through its center also passes through a point adjacent to the axis of articulation (X—X) of the flexible member on the rigid member.

7. A coupling device according to claim 2, wherein the rigid member of the second section has a convex surface complementary to a concave surface of the first section and one end of the flexible member has a convex surface interacting with a matching concave surface of the first section after snapping to retain the first section in the second section.

* * * * *